(12) United States Patent
Wang et al.

(10) Patent No.: US 8,663,781 B2
(45) Date of Patent: Mar. 4, 2014

(54) CERAMIC ARTICLE AND METHOD FOR MAKING SAME, AND ELECTRONIC DEVICE USING SAME

(75) Inventors: Ren-Bo Wang, Shenzhen (CN); Xin-Wu Guan, Shenzhen (CN); Po-Feng Ho, New Taipei (TW); Wu-Zheng Ou, New Taipei (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 13/430,697

(22) Filed: Mar. 27, 2012

(65) Prior Publication Data

US 2013/0045359 A1 Feb. 21, 2013

(30) Foreign Application Priority Data

Aug. 19, 2011 (CN) .......................... 2011 1 0239234

(51) Int. Cl.
*C04B 35/505* (2006.01)
(52) U.S. Cl.
CPC .................................. *C04B 35/505* (2013.01)
USPC ............ 428/141; 501/151; 501/152; 264/667

(58) Field of Classification Search
CPC ...................................................... C04B 35/505
USPC ................................................. 501/151, 152
See application file for complete search history.

(56) References Cited

U.S. PATENT DOCUMENTS

| | | | | |
|---|---|---|---|---|
| 3,545,987 A | * | 12/1970 | Anderson | ..................... 501/152 |
| 3,935,119 A | * | 1/1976 | Barber et al. | ........... 252/301.4 F |
| 5,521,387 A | * | 5/1996 | Riedner et al. | ................ 250/367 |
| 6,639,362 B1 | * | 10/2003 | Scott et al. | ..................... 313/578 |
| 7,449,238 B1 | * | 11/2008 | Villalobos et al. | ............ 428/403 |

FOREIGN PATENT DOCUMENTS

| | | | |
|---|---|---|---|
| WO | WO2007107954 A1 | * | 9/2007 |
| WO | WO 2007107954 A2 | * | 9/2007 |

* cited by examiner

*Primary Examiner* — Maria Veronica Ewald
*Assistant Examiner* — Zheren J Yang
(74) *Attorney, Agent, or Firm* — Altis Law Group, Inc.

(57) ABSTRACT

A display window is formed by mechanically processing a transparent ceramic article. The composition of the ceramic article includes yttrium oxide and thorium oxide, the mole percentage of yttrium oxide is about 85% to about 94.99%, and the mole percentage of thorium oxide is about 4.99% to about 15%. The display window has a high light transmittance, good acid and alkali corrosion resistance, high hardness, long lifetime.

16 Claims, 3 Drawing Sheets

CERAMIC ARTICLE AND METHOD FOR MAKING SAME, AND ELECTRONIC DEVICE USING SAME

BACKGROUND

1. Technical Field

The present disclosure relates to a transparent ceramic article, method for making the transparent ceramic article, and an electronic device using the transparent ceramic article.

2. Description of Related Art

Many display windows of electronic devices are made of glass. Three-dimensional (3D) glass is one kind of structure glass which is different from the plate glass. Display windows made by 3D glass can effectively broaden the displaying range. However, the preparation of 3D glass can be difficult and expensive.

Therefore, there is room for improvement within the art.

BRIEF DESCRIPTION OF THE FIGURE

Many aspects of the electronic device, the display window, and the transparent ceramic article can be better understood with reference to the following drawings. The components in the drawings are not necessarily drawn to scale, the emphasis instead being placed upon clearly illustrating the principles of the electronic device, the display window, and the transparent ceramic article. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
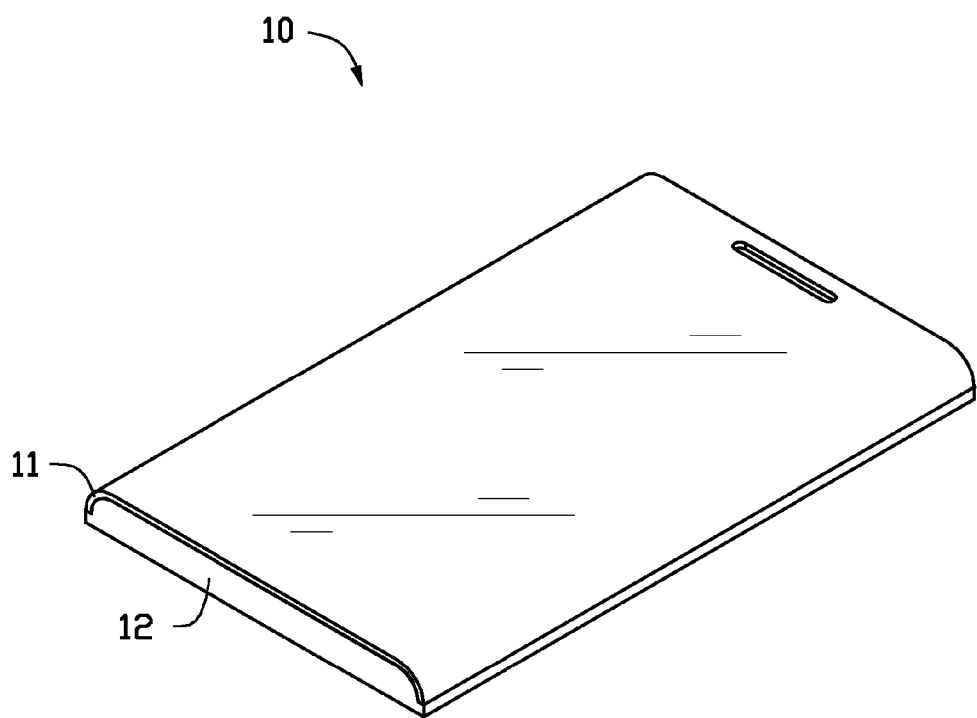
FIG. 1 is a schematic view of an exemplary embodiment of an electronic device.
Figure 2:
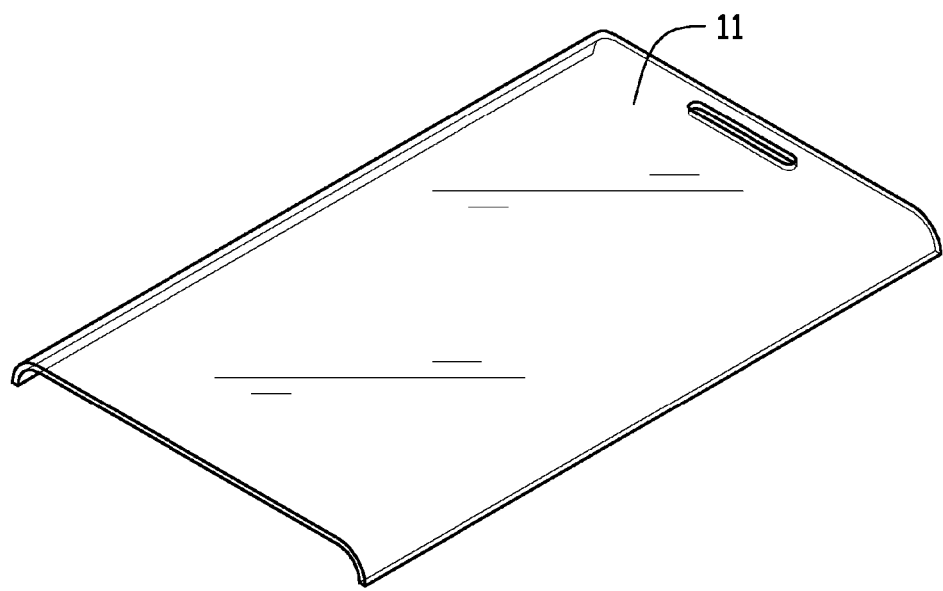
FIG. 2 is a schematic view of an exemplary embodiment of a display window.
Figure 3:
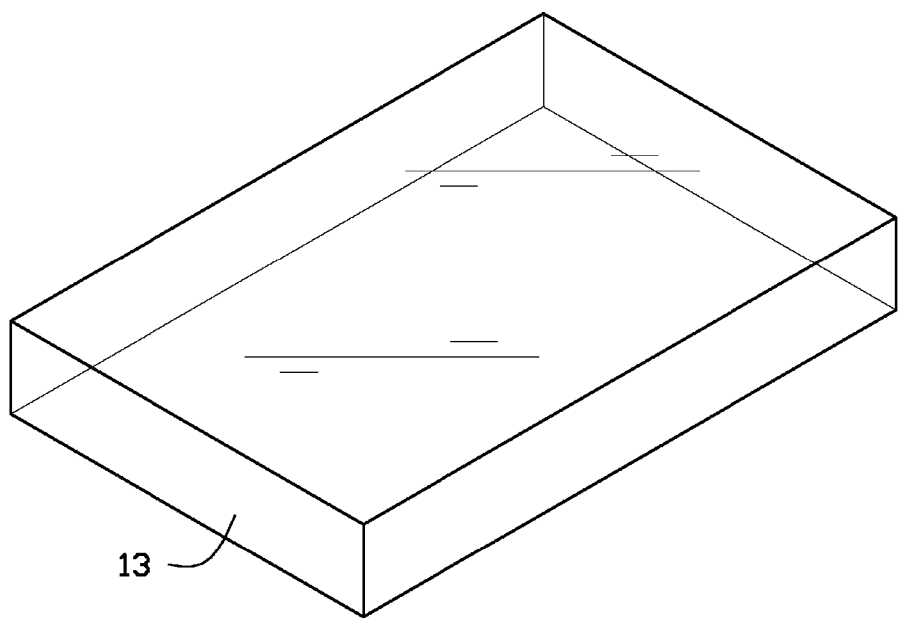
FIG. 3 is a schematic view of an exemplary embodiment of a transparent ceramic article.

FIG. 1 shows an electronic device 10 according to an exemplary embodiment. The electronic device 10 includes a main body 12 and a display window 11 installed on the main body 12. FIG. 2 shows the display window 11 which is made by mechanically processing a transparent ceramic article 13 shown in FIG. 3.

The composition of the transparent ceramic article 13 contains yttrium oxide ($Y_2O_3$), thorium oxide ($ThO_2$), lithium fluoride (LiF), and terbium oxide ($Tb_2O_3$). The mole percentage of yttrium oxide is about 85% to about 94.99%, the mole percentage of thorium oxide is about 4.99% to about 15%, the mole percentage of lithium fluoride is about 0.003% to about 0.007%, and the mole percentage of terbium oxide is about 0.003% to about 0.007%.

The transparent ceramic article 13 made according to the above recipe will have a grain size of about 5 μm to about 20 μm and a porosity of less than 0.9%. The light transmittance of the transparent ceramic article 13 is more than 85%. The bending strength of the transparent ceramic article 13 is about 280 Mpa to about 350 Mpa.

The surface roughness Ra of the display window 11 is about 0.05 μm. The display window 11 has a good acid and alkali corrosion resistance.

A method for making the transparent ceramic article 13 may include the following steps:

Mixing Materials Together

Yttrium oxide powder, thorium oxide powder, lithium fluoride powder, and terbium oxide powder are mixed together to form a mixture. The mole percentage of yttrium oxide is about 85% to 94.99%, the mole percentage of thorium oxide is about 4.99% to 15%, the mole percentage of lithium fluoride is about 0.003% to 0.007%, and the mole percentage of terbium oxide is about 0.003% to 0.007%. The yttrium oxide powder and the thorium oxide powder have particle size of about 60 nm to 100 nm, and their purity is more than 99.99%.

Cool Isostatic Pressing

The mixture is cool isostatic pressed to form a body (not shown). The cool isostatic pressing is carried out at a pressure of about 240 MPa to 300 MPa for about 30 min to about 80 min.

Sintering the Body

The body is sintered at an internal furnace temperature of about 1380° C. to about 1580° C. for about 30 min to about 400 min. During the sintering process, thorium oxide is used as the sintering binder and sintering inhibitor. The thorium oxide can reduce surface energy of the yttrium oxide grains and effectively inhibit the migration of crystal boundary and the growth of the grains, which makes the yttrium oxide powder to have an optimal sintered density. The small amount of lithium fluoride is used as the sintering aid, while terbium oxide can reduce the grain size of sintered particles.

Hot Isostatic Pressing

The sintered body is treated in a hot isostatic pressing furnace (not shown) to form the transparent ceramic article 13. The hot isostatic pressing furnace is fed with argon gas as protection gas. The hot isostatic pressing is carried out at an internal furnace temperature of about 1950° C. to about 2150° C. and a pressure of about 240 MPa to about 300 MPa for about 900 min to about 3600 min. The relative density of the transparent ceramic body 13 is more than 99.9%. The relative density is the density ratio of porous body to non-porous body.

The transparent ceramic article 13 is mechanically processed by a computer numerical control (CNC) machine to form a desired shape of the display window 11. Then the transparent ceramic body 13 with desired shape is ground and polished. The grinding device may be surface lapping machine or roll mill depending on the shape of the display window 11. The polishing treatment uses a mixture of emery and ceramic-specific polishing solution. The surface roughness Ra of the display window 11 is about 0.05 μm.

This disclosure uses the transparent ceramic article 13 to window 11 The processing method of this display indo 11 is the 3D structure glass display window. The display window 11 transmittance, good acid and alkali corrosion resistance, high hardness, long lifetime.

It is believed that the exemplary embodiment and its advantages will be understood from the foregoing description, and it will be apparent that various changes may be made thereto without departing from the spirit and scope of the disclosure or sacrificing all of its advantages, the examples hereinbefore described merely being preferred or exemplary embodiment of the disclosure.

What is claimed is:

1. A transparent ceramic article, the composition of the ceramic article comprising yttrium oxide, thorium oxide, and terbium oxide, wherein the mole percentage of yttrium oxide is about 85% to about 94.99%, the mole percentage of thorium oxide is about 4.99% to about 15%, and the mole percentage of terbium oxide is about 0.003% to about 0.007%.

2. The ceramic article as claimed in claim 1, wherein the composition of the ceramic article further comprises lithium fluoride, the mole percentage of lithium fluoride is about 0.003% to about 0.007%.

3. The ceramic article as claimed in claim 2, wherein the transparent ceramic article has a grain size of about 5 μm to about 20 μm.

4. The ceramic article as claimed in claim 2, wherein the porosity of the transparent ceramic article is less than 0.9%.

5. The ceramic article as claimed in claim 2, wherein the light transmittance of the transparent ceramic article is more than 85%.

6. The ceramic article as claimed in claim 2, wherein the bending strength of the transparent ceramic article is about 280 Mpa to about 350 Mpa.

7. The ceramic article as claimed in claim 2, wherein the relative density of the transparent ceramic body is more than 99.9%

8. An electronic device, comprising:
a main body, and a display window installed on the main body,
wherein the composition of the display window comprises yttrium oxide, thorium oxide, and terbium oxide, the mole percentage of yttrium oxide is about 85% to about 94.99%, the mole percentage of thorium oxide is about 4.99% to about 15%, and the mole percentage of terbium oxide is about 0.003% to about 0.007%.

9. The electronic device as claimed in claim 8, wherein the composition of the display window further comprises lithium fluoride, the mole percentage of lithium fluoride is about 0.003% to about 0.007%.

10. The electronic device as claimed in claim 9, wherein the light transmittance of the display window is more than 85%.

11. The electronic device as claimed in claim 9, wherein the surface roughness Ra of the display window is 0.05 μm.

12. A method for making a transparent ceramic article, comprising:
mixing yttrium oxide powder, thorium oxide powder, lithium fluoride powder and terbium oxide powder together to form a mixture, the mole percentage of yttrium oxide being about 85% to 94.99%, the mole percentage of thorium oxide being about 4.99% to 15%, the mole percentage of lithium fluoride being about 0.003% to about 0.007%, and the mole percentage of terbium oxide being about 0.003% to about 0.007%;
cool isostatic pressing the mixture to form a body;
sintering the body; and
hot isostatic pressing the sintered body to form the transparent ceramic article.

13. The method as claimed in claim 12, wherein the yttrium oxide powder and the thorium oxide powder have particle size of about 60 nm to about 100 nm, and their purity is more than 99.99%.

14. The method as claimed in claim 12, wherein the sintering the body is carried out at an internal furnace temperature of about 1380° C. to 1580° C. for about 30 min to 400 min.

15. The method as claimed in claim 12, wherein the cool isostatic pressing treatment is carried out at a pressure of about 240 MPa to about 300 MPa for about 30 min to about 80 min.

16. The method as claimed in claim 12, wherein the hot isostatic pressing treatment is carried out at an internal furnace temperature of about 1950° C. to about 2150° C. and a pressure of about 240 MPa to about 300 MPa for about 900 min to about 3600 min.

\* \* \* \* \*